(12) United States Patent
Fost et al.

(10) Patent No.: US 11,762,760 B1
(45) Date of Patent: Sep. 19, 2023

(54) SCALABLE TEST WORKFLOW SERVICE

(71) Applicant: Amazon Technologies, Inc., Seattle, WA (US)

(72) Inventors: Tyler Prescott Fost, Seattle, WA (US); Nicolas A Hertl, Los Gatos, CA (US); Edward Farrell, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 17/489,492

(22) Filed: Sep. 29, 2021

(51) Int. Cl.
*G06F 11/36* (2006.01)
*G06F 11/34* (2006.01)

(52) U.S. Cl.
CPC ...... *G06F 11/3684* (2013.01); *G06F 11/3414* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 9,170,821 B1* | 10/2015 | Palaniappan | ....... | G06F 11/3688 |
| 10,776,251 B1* | 9/2020 | Elgarat | ............... | G06F 11/3684 |
| 11,108,638 B1* | 8/2021 | Alluboyina | ......... | H04L 41/0893 |
| 11,636,029 B2* | 4/2023 | Deb | ........................ | H04L 67/34 |
| | | | | 717/125 |
| 2021/0191843 A1* | 6/2021 | Stocker | ............... | G06F 11/3664 |

OTHER PUBLICATIONS

AWS Solutions Library "Distributed Load Testing on AWS", dated Aug. 5, 2021, (https://aws.amazon.com/solutions/implementations/distributed-load-testing-on-aws/), pp. 1-6.
"Starting a Test—Application Migration Service", dated Aug. 5, 2021, (https://docs.aws.amazon.com/mgn/latest/ug/stating-test.html), pp. 1-4.
"Test the Migration—AWS Prescriptive Guidance", dated Aug. 5, 2021, (https://docs.aws.amazon.com/prescriptive-guidance/latest/strategy-database-migration/test-migration).

* cited by examiner

*Primary Examiner* — Isaac Tuku Tecklu
(74) *Attorney, Agent, or Firm* — Robert C. Kowert; Kowert, Hood, Munyon, Rankin & Goetzel, P.C.

(57) ABSTRACT

A scalable test workflow service facilitates management, automated generation and execution of numerous test cases. Test definitions representing tasks to be executed to validate a capability, parameter providers that provide metadata options, and step executors that execute the individual steps of the tasks are all specified. In response to a request to perform a test, an iterative process builds, based on the test definitions and the corresponding parameters, test instances that are executed to obtain the test results. For example, a run tests workflow initiates a test initialization workflow for each test definition. The test initialization workflows call the parameter providers to obtain parameter combinations used to create test instances, and initiate test execution workflows for each parameter combination. Each test execution workflow calls a step executor for each step of the test definition using parameters for the test instance, and returns the results. Results are aggregated and returned.

20 Claims, 9 Drawing Sheets

SCALABLE TEST WORKFLOW SERVICE

BACKGROUND

Preparation of tests for testing of computer software systems can be a time-consuming, laborious, tedious process. For example, in some systems, a test package is built and executed as a single binary on a shared fleet of test workers. In some such systems, test scaling is limited to the power of a multi-threaded process on a single host. In some systems, thorough testing may require creation and execution of thousands of tests, taking days, even with a powerful host.

Additionally, writing test cases can be cumbersome when it comes to covering multiple similar test cases. For example, in some instances, tests must be copied with minimal changes, such as an entirely new test file that only increments the major version of a source database. Testing the coverage of a feature across N sources and N targets may require $N^2$ tests to be written. Furthermore, some tests may hide configuration options in source code, which makes it even harder to extend the tests for new types or versions. For example, adding support for creating a new version to be tested may require changes to five or six files to create parameter groups, modify resource creation predicates, and configure the default choices for both.

Figure 1:
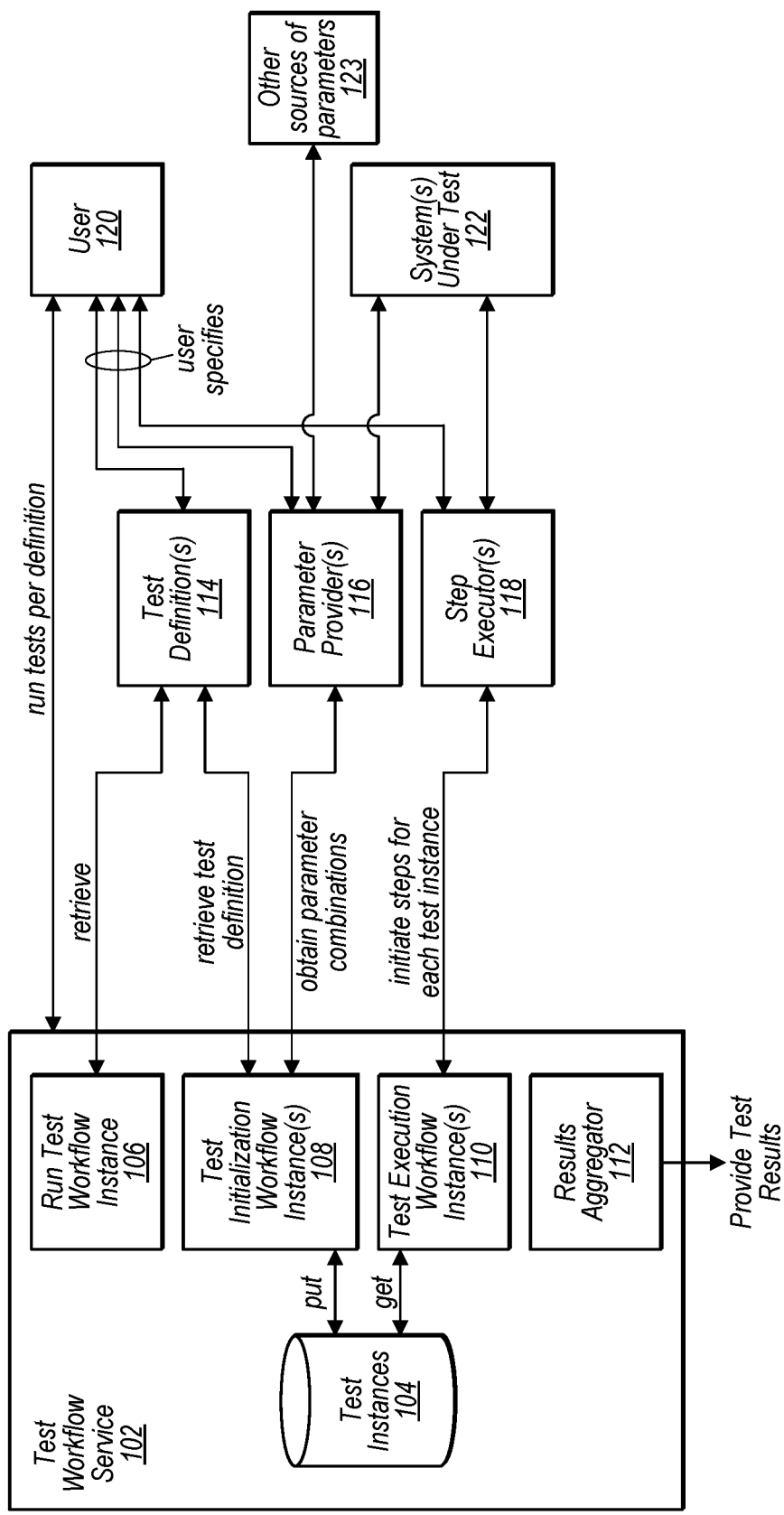
FIG. 1 is a block diagram illustrating information flows for a scalable test workflow service, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments described herein relate to a scalable test workflow service that facilitates generation, management and/or execution of large volumes of test cases.

In embodiments, the scalable test workflow system provides an interface for engineers to define tests as a list of steps which represent each task that must execute in order to validate some capability (e.g., a test definition). Embodiments of the scalable test workflow system provide an interface for engineers to define parameter providers (e.g., functions or the like) that provide applicable metadata options for each step, allowing a single test definition to be used for multiple variables. Some such systems simplify scheduling and execution (e.g., via step executor functions, also specified in the test definitions) of large numbers of similar tests so tests can quickly be written that cover thousands of test parameters combinations.

Some embodiments may use workflows to orchestrate the execution of each test instance. For example, scalable test workflow system workflows may be created for all actively running tests for a particular test run. Each workflow may invoke either a parameter provider or a step executor function in order to take some action on a particular test definition. Some embodiments may be implemented on a combination of service provider workflow service, service provider serverless compute service, and service provider autoscaling service to parallelize a test run across multiple machines. Some embodiments of a scalable test workflow system take action on the next step of a test instance as soon as it is ready, and may also operate in parallel across multiple machines.

For at least some embodiments, non-obvious automation gains are obtained by a creative use of logic represented in code that automates a buildout of static lists of parameter values (e.g., the test initialization workflows invoking the parameter providers for each step to obtain the parameters, and the test execution workflow instances writing test instances per parameter combination) in such a manner that the list of parameters (and/or the parameter values) may be dynamic, changing in response to context, or in response to configuration changes to the system under test, or in response to changes at other targets of the parameter providers, or otherwise.

Test Definition(s). In embodiments, engineers may define each of their tests in a file called a test definition. Each test definition may include one or more test steps that define the tasks that must occur in order for a test to validate some feature or functionality. In embodiments, a test definition includes or specifies one or more parameters (or parameter providers, in some embodiments) and one or more steps (to be performed by step executors, which may also be specified in the test definition, in embodiments). In a non-exhaustive example, a test definition may be implemented as JSON file that defines the parameters (e.g., source and target parameters, data file parameters, etc.) for a particular test and the steps (e.g., business logic, such as, but not limited to create a database, start a task, validate the task has performed correctly, etc.) needed to run the test.

In embodiments, some Test Definitions could define an empty list/no parameters. In such a case, the Test Definition could be converted into a single test instance with no parameter substitutions, and still have all steps of the Test Definition get executed. Such a Test Definition may not utilize the full capabilities of such a service, but is contemplated without limitation A step may correspond to a function in a step executor, which contains the service test logic to perform that task (in one non-exhaustive example, the function may include service test logic that executes at a stateless, event-driven compute service, illustrated in FIG. 8, described below). Some test definitions may be reused for multiple similar parameter values.

Dynamic Parameter Discovery

In some such cases, an engineering team may define parameter provider functions (e.g., multiple classes that know how to instantiate various lists of metadata, by invoking APIs of other services for example, in embodiments). In one non-exhaustive example, the parameter provider function may include service test logic that executes at a stateless, event-driven compute service, illustrated in FIG. 8, described below) that can provide valid parameters for the test definition. Upon execution, each of the parameter providers defined in a test definition may be invoked in order to enumerate all combinations of valid parameters, in embodiments. In embodiments, a parameter provider may include logic to determine the parameters (e.g., at runtime by making calls to other systems to ascertain the parameters, in some embodiments). In some such systems, one test run may trigger N test definitions, each test definition having M parameter provider functions that each may return one or more parameters, thereby multiplying the number of test cases. In embodiments, a subsequent test run of the same test may cause the same parameter provider to return more parameters than the last test run (e.g., for new tables or entries added to a database, or a new type of database, for example) growing the number of overall test cases for the same test. In some such embodiments, such functionality can reduce or even eliminate the need for test engineers to modify the test definitions to test new functionality of the system under test.

In some embodiments, each test definition defines multiple parameter specifications, each of which has a name (source, target, etc.). In some embodiments, each parameter specification also specifies a function that may or may not be used for initializing multiple parameter specifications (for example—a parameter provider that enumerates all versions of a particular database engine). Such a function may return the list of one or more parameters. In embodiments, a test case is created for each combination of values for each of the named parameters. It is contemplated that in some embodiments, a parameter provider function may be used at most once. In some embodiments, the parameter provider may be used more than once.

In some embodiments, the system-generated list of parameter combinations may include invalid combinations. The system (e.g., logic within a parameter provider or within the step executor or similar) may include logic to identify, skip, and/or otherwise invalidate the invalid combinations, in embodiments.

Each particular set of parameters can be combined with the test definition (the combination sometimes referred to herein as a test instance) which can be used to manage the state of a test execution. In some such embodiments, a single test definition can be written and used for multiple different test cases.

Figure 2:
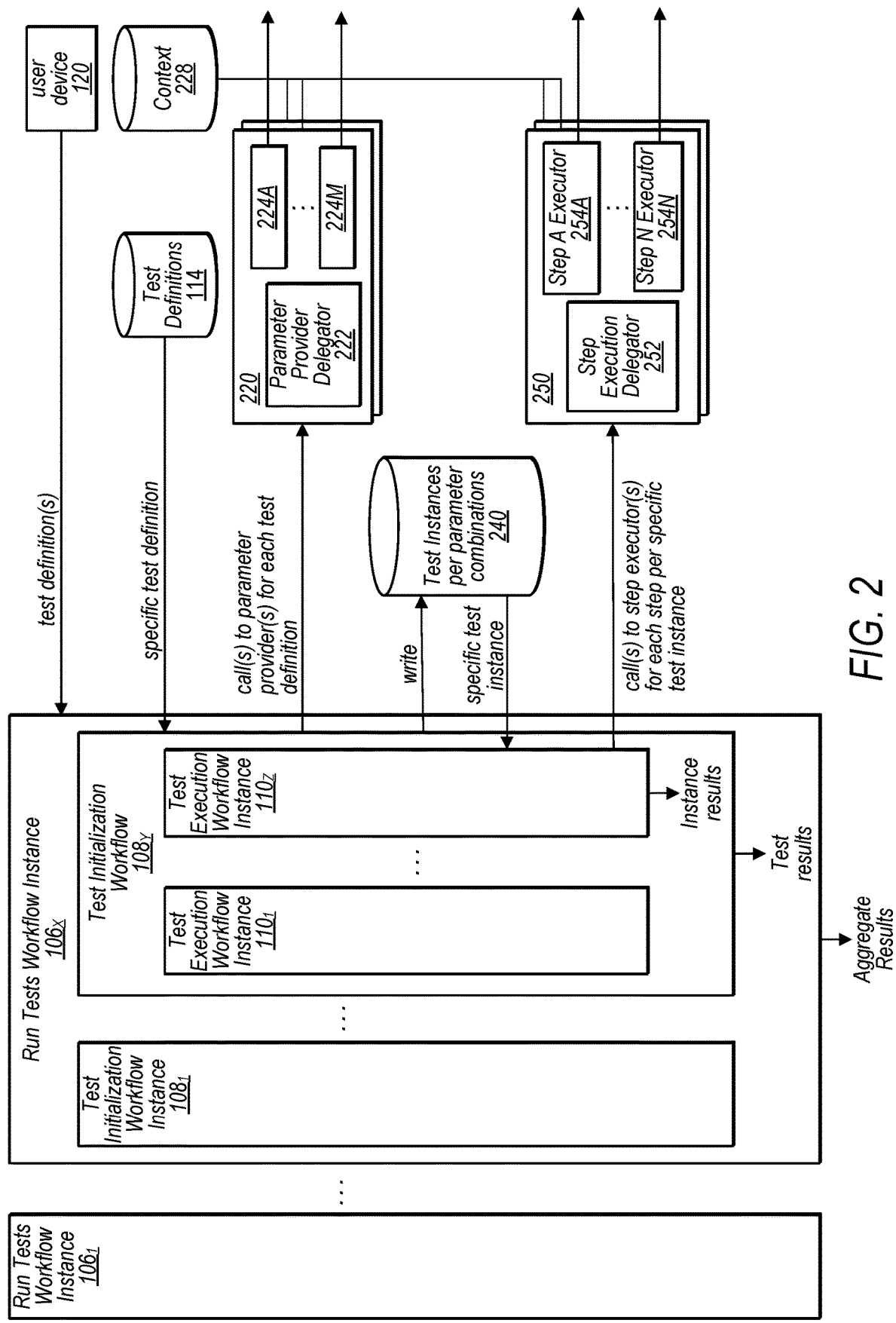
FIG. 2 is a block diagram illustrating workflows for a scalable test workflow service, according to some embodiments.
Figure 8:
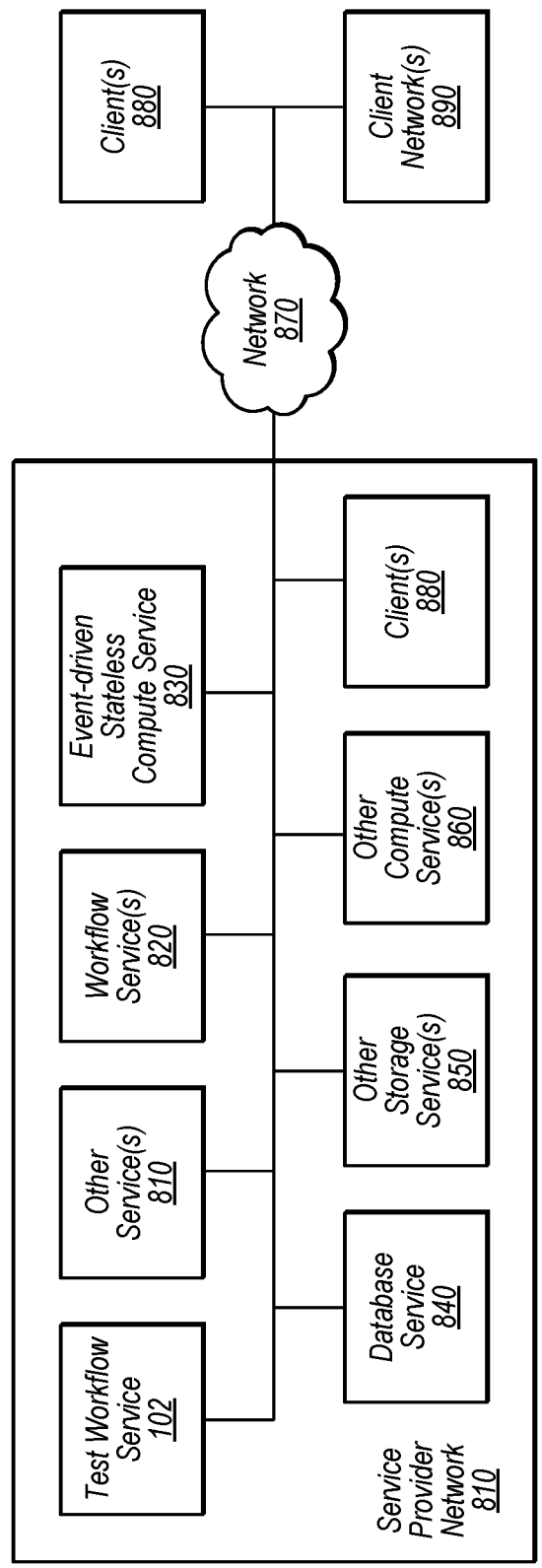
FIG. 8 is a logical block diagram illustrating an example service provider network that implements a scalable test workflow service, according to some embodiments.
Figure 9:
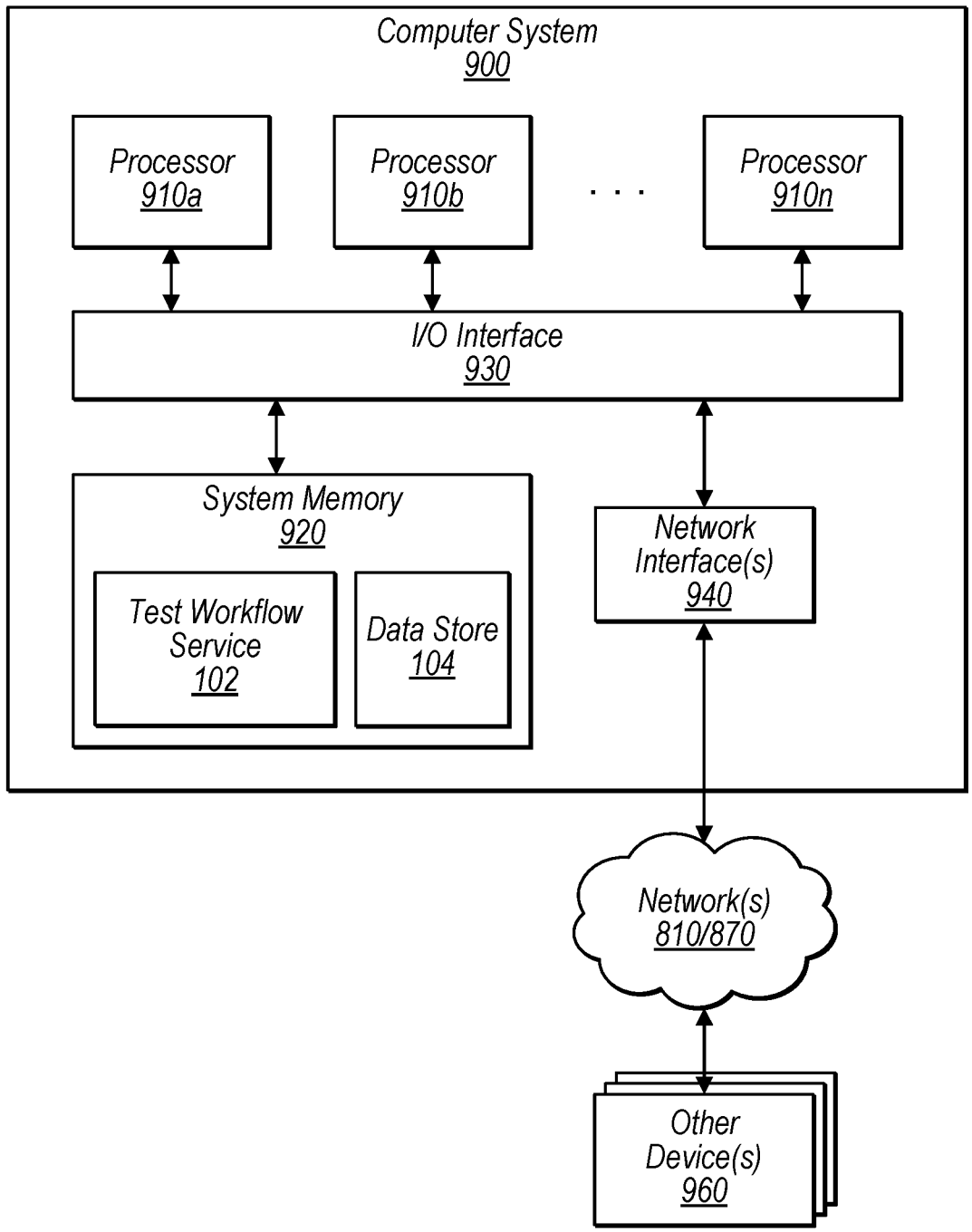
FIG. 9 is a block diagram showing an example computing system to implement the various techniques described herein, according to some embodiments.

FIGS. 1 and 2 are block diagrams of a scalable test workflow service that illustrate information flows. FIGS. 3-7 are process diagrams illustrating functionality that may be performed by one or more of the components illustrated in FIGS. 1, 2, 8 and 9. FIGS. 8 and 9 are block diagrams of components of a scalable test workflow service. The illustrated embodiments and disclosed alternatives are examples and non-limiting. It is contemplated that embodiments may include more, fewer, or different arrangements of the illustrated components.

FIG. 1 is a block diagram illustrating information flows for a scalable test workflow service, according to some embodiments. FIG. illustrates a user 120 (e.g., an engineer using a workstation computer, or the like) that specifies features (e.g., illustrated in FIG. 3, described below) for use by the test workflow service 102. The test workflow service 102 uses the specified features to generate and execute test instances that test one or more systems under test 122.

In embodiments, one or more components of the test workflow service 102 may be implemented on or across one or more computers comprising respective processors and memory configured. For example, the test workflow system may be implemented on a single computer, or may be implemented across a number of virtual machines hosted on one or more computers. In some embodiments, the test workflow system 102 may be configured to scale up from execution on a single computer to execution across a number of computers, and to scale down. In some embodiments, the various workflow instances may be launched to operate on the same or different computers from the test workflow service 102. In some embodiments, one or more components of the service (e.g., the test workflow service interface for receiving the request to run the test, the run test workflow instance 106, the parameter providers, the step executors, etc. without limitation that are described as being implemented by one or more computers may each be operating on distinct respective ones of the computers or may be operating on a same single machine, or may share one or more of the computers, in embodiments.

In the illustrated example, user 120 specifies test definitions 114, parameter providers 116 and step executors 118. For example, the test workflow service 102 may prompt the user 120 for the test definitions 114, parameter providers 116 and step executors 118 via an interface (e.g., via a graphical user interface) or the user 120 may specify a source for the test definitions 114, parameter providers 116 and step executors 118 via a command line interface or application program interface or the like. In at least some embodiments, one or more of the test definitions 114, parameter providers 116 and step executors 118 may be stored by the system and may be reused for performing other tests. Some tests may combine pre-existing test definitions 114, parameter providers 116 and step executors 118 with newly-created test definitions 114, parameter providers 116 and step executors 118. In the illustrated embodiment, parameter providers(s) 116 may obtain parameters from any of the system(s) under test 122 or from other sources of parameters 123, such as a database of parameters, as a non-exhaustive example. In some embodiments the parameters may be obtained from the other sources of parameters 123 and not from the system under test 122.

FIG. 1 illustrates that user 120 sends a request, to perform a test, to test workflow service 102. For example, the test workflow service 102 may prompt the user 120 to run the tests via an interface (e.g., via a graphical user interface) or the user may instruct the tests to be run via a command line interface or application program interface or the like. In response, a run tests workflow instance is initiated (illustrated in FIG. 4, described below). For example, a component of the test workflow service 102 (e.g., a run test workflow instance 106) retrieves (e.g., from storage) one or more test definitions 114 specified for performing the requested test, and initiates test initialization workflow instance 108 for each test definition. In some embodiments, the test workflow service may provide an application program interface (API) for uploading or creating test definitions, parameter providers and/or step executors.

In embodiments, the test initialization workflow will read the test definition from storage to determine all required parameter combinations for which it needs to execute the test definition. The test initialization workflow will invoke the parameter provider functions for each parameter specified in the test definition to get the lists of valid parameter values for each variable. FIG. 1 illustrates that the test initialization workflow instances 108 (e.g., illustrated in FIG. 6, described below) retrieve respective test definitions 114, obtain parameter combinations via parameter providers 116 (e.g., parameter provider functions). Once the lists of values for each parameter is specified, the test initialization workflow will create a test instance for each combination of parameters. The test initialization workflow instances use the test definitions and the parameters to create test instances and writes the test instances in test instances data store 104. The test workflow service will write each test instance to storage. Once written, the test initialization workflow will create a child test execution workflow for every test instance. FIG. 1 illustrates that test execution workflow instances 110 (e.g., illustrated in FIG. 7, described below, and initiated by the test initialization workflow instances 108) gets the test instances from the data store 104 and calls step executors 118 to perform the steps of each test instance.

In embodiments, a test execution workflow brings all of this information together and actually executes the steps of a test definition for a particular test instance. For example, for each step in the test definition the workflow is assigned, the workflow will look at the contents of the test definition and determine if any of the arguments specified in the test definition are variable parameters. It may then build up a map of arguments from the test definition, replacing any variable parameters with the value of the parameter defined in the test instance. Once the arguments are built, the test workflow service 102 will invoke the test author's step executor 118 for a step, and get the result. The step executors 118 perform the steps against the system under test 122 and a results aggregator 112 aggregates and provides the test results.

In embodiments, an author of the test may implement a step executor for each of the types of test steps. For example, a request resources step could provision required databases and other resources. An executeSql step could implement reading a particular file and executing it as SQL on a particular database. A runTask step could implement creating, starting, and stopping a particular task A validate task step could implement verifying the performance of the particular task. A cleanup resources step could ensure all inserted data, created schemas, tasks, etc. are deleted at the end of the test run, as non-exhaustive examples.

Some test steps may require information to be shared between steps. Continuing with the example above, executeSql, runTask, validate task, and cleanup resources all may require knowing the database instance or task instance identifiers of the resources created in the request resources step. Test workflow service may provide functionality to manage this in the form of a test context object (stored at 228 in FIG. 2). At the beginning of a test run, the test workflow service may create storage in the test author's account to store test context (such as, but not limited to, in a context storage object) for each test instance. Parameter providers and step executors may be provided the test context for a particular test instance upon invoking the method from the test workflow service. The test author's parameter providers and/or step executors may modify this object, and upon return, the test workflow service can manage writing this context back to the context data store from which it can be pulled in the next step. In embodiments, test authors can use this to manage either global context (e.g., test arguments, etc.) or instance context (e.g., DB connection info, task instance identifiers, etc.).

In an example embodiment, the system may designate context storage for state information for performing tests according to the test definitions, and store state information between different invocations of the parameter provider function (or invocation of a step executor) triggered at the event-driven, stateless compute service to request the one or more parameters (or to execute the one or more steps), and release the context storage after obtaining the results of performing the test. The parameter provider functions and/or the step executors may query the context information to perform operations, such as obtaining parameters, building test instances and/or executing steps, or to write context information for future use, by a next step, or by a next test run, etc.

In some embodiments, tests may depend on others. For example, a first test (e.g., a first test definition) may ensure that database validation works as expected, and then once that test has completed and passed, a second test (a second test definition) that tests migration utilizing the functionality that was already tested by the first test definition could automatically be performed. In embodiments, this may involve defining, via a test definition, one or more prerequisite test definitions. In embodiments, one or more components of the system may apply a sort algorithm to determine the ordering of which of the test definitions should happen next.

The test workflow service may continue to move on to the next step so long as the test result is successful and there are still steps to execute. When the workflow has finally run out of steps or encountered a non-successful result, it may stop looping and return that result to the test initialization workflow that created it, for example. Context information may be stored to storage within the customer account, in embodiments.

In embodiments, each test execution workflow can return the result of executing a particular test instance to its parent test execution workflow. The test execution workflow may aggregate all of these results into a total "success" or "failure" result, and return that back to its parent run tests workflow. The run tests workflow may perform similar aggregation to determine the final result, notify the requester, and close the workflow.

FIG. 2 is a block diagram illustrating workflows for a scalable test workflow service, according to some embodiments. FIG. 2 illustrates relationships between workflows that correspond to functionality that may be performed by one or more components of the scalable test workflow service illustrated in FIG. 1. In embodiments, the scalable test workflow service works as a hierarchy of workflows that orchestrates test execution and reporting: (e.g., a run tests workflow, a test initialization workflow, and a test execution workflow. In embodiments, each workflow is in charge of managing the execution of a collection of test definitions, a single test definition, or a test instance.

FIG. 2 illustrates multiple run tests workflow instances $106_1 \ldots 106_X$ (e.g., one or more initiated by a request to run a test from user device 120). Individual ones of run tests workflow instances 106 may be initiated by any of various user devices 120. In some cases, individual run tests workflow instances 106 may be requested to run against respective different target system(s) under test (e.g., system(s) under test 122), but may be requested against a same target system under test, without limitation. In the illustrated embodiment, the run tests workflow (illustrated in FIG. 4, described below) lasts for the duration of a particular test run.

FIG. 2 illustrates the run tests workflow instance $106_X$ has used test definitions as a basis for initiating multiple test initialization workflow instances $108_1$-$108_Y$ and that the test initialization workflow instances $108_1$-$108_Y$ make calls to parameter providers 220A-N to enumerate parameters (e.g., obtain a list of parameter combinations FIG. 4, block 408) for respective test definitions. for each of the corresponding test instances 240 created by the test execution workflow instances $110_{1-Z}$.

In embodiments, parameter providers 220 (the multiple boxes represent multiple parameter providers) may perform functionality to provide valid parameters for the test definition. For example, upon execution, each parameter provider defined in a test definition may be invoked in order to enumerate values for a particular parameter (e.g., all engine versions, all database names, all letters in the alphabet, etc.). In embodiments, the workflow service is in charge of combining all of these lists into the final set of all combinations (e.g., enumerating) all combinations of valid parameters). Each particular set of parameters can be combined with the test definition (sometimes called a test instance) which will manage the state of a test execution. In this way, a single test definition can be written and used for multiple different test cases.

Figure 4:
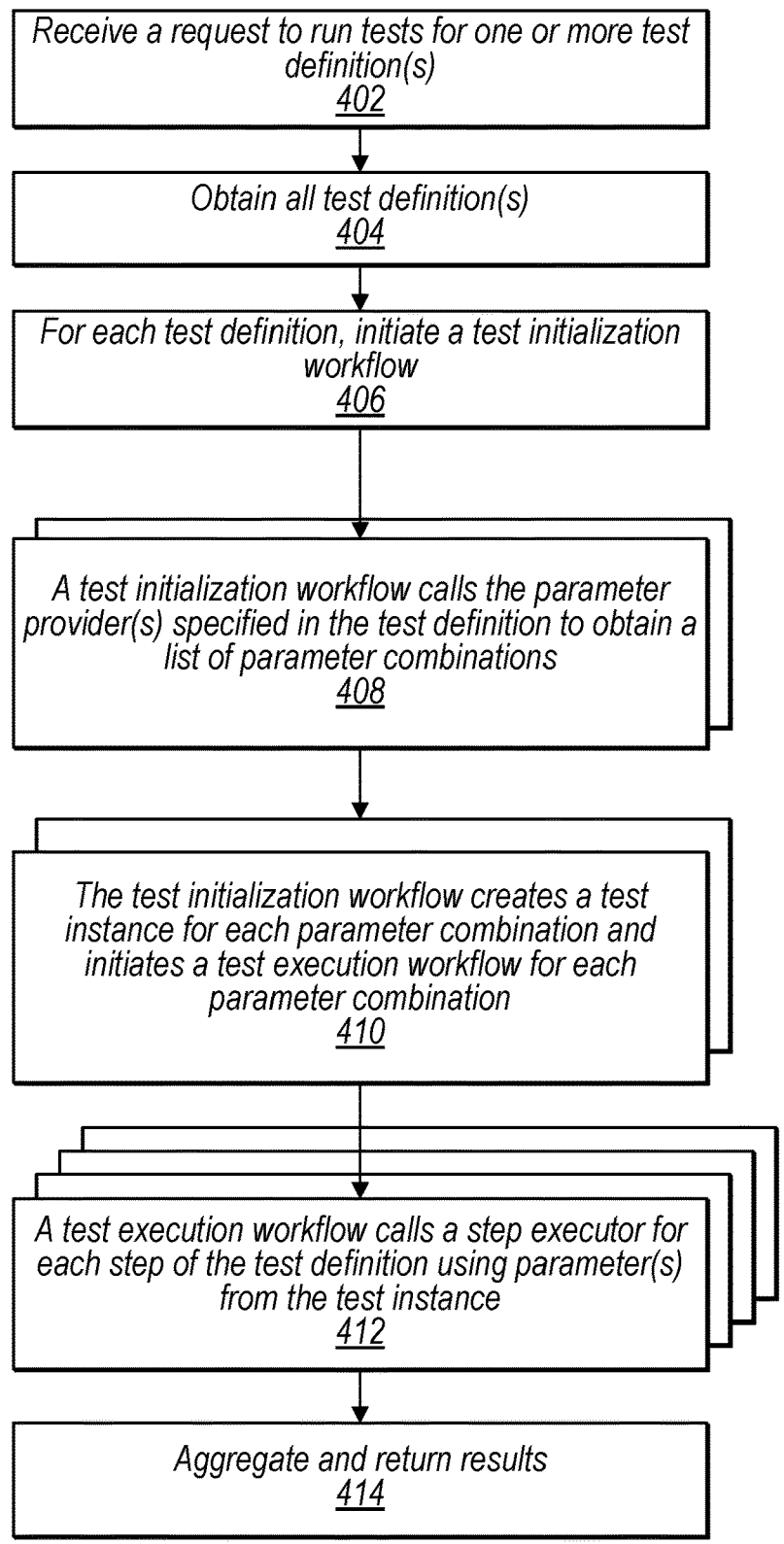
FIG. 4 is a process diagram that illustrates relationships among various nested workflows for a scalable test workflow service, according to some embodiments.

In the illustrated embodiment, a given one of multiple available parameter provider delegators 222 (e.g., one that receives a parameter provider call from a workflow instance, such as test initialization workflow in FIG. 2, $108_Y$, see block 408 in FIG. 4) may delegate parameter provider operations 224A-M (e.g., operations such as, but not limited to, calls to other systems internal or external to the local system, such as to the system under test, or some other source of configuration information, to determine configuration information (e.g., expressed as parameters in a test instance) about the system under test, or calls to services in a service provider network to determine information for carrying out the test, etc.). In embodiments, a parameter provider may access other systems to determine what parameters should be gathered to include in the parameter list for a particular test definition.

In embodiments, the parameter provider may access a context store 228 to obtain existing parameter information stored at the context store or may store the parameters obtained by operations 224A-M to context data store 228 (e.g., see FIG. 5, blocks 504 and 514, described below). For example, particular functions of the parameter provider 220A may perform operations to obtain values for variable parameters, such as but not limited to making API calls (e.g., to the system under test or some other target) to learn configuration values about the system under test. In one non-exhaustive example, a function may make an API call to the system under test to obtain a type of database for the system under test. Other example parameter providers may be called upon to provide a list of valid database configurations, an indication of a version of an application under test, or a unique schema name for the test, etc. without limitation.

In embodiments where parameter providers are functions, parameter providers may be given a list of arguments to the function that allow the same parameter provider to be used in different ways by different test definitions. The parameter providers may also be provided access to a test context object (e.g., stored in context data store 228). In embodiments, the test context object may be implemented as a map of key(s) to value(s) that can be populated by the test workflow service as well as by the test requester (e.g., by specifying some list of command line arguments that only apply to a particular run). As a result, the same parameter provider can be used to set the same type of parameter with different arguments across multiple test definitions. Parameter provider functions allow test metadata to be static or dynamic depending on implementation, in embodiments. Parameter providers may include arguments that limit which of the returned parameters are used in the parameter combinations for the test, in embodiments.

In FIG. 2, test initialization workflow instances 108A-108N initiate test execution workflow instances (e.g., 110A-110N) for each of the test instances 240 and the test execution workflow instances make calls to step executors 250 for each step per a specific test instance.

In the illustrated embodiment, one of multiple different step execution delegators 252 receives one or more calls from a workflow (e.g., from a test execution workflow instance $110_z$) and delegates the step to one of multiple step executors 254A-N. In embodiments, each step in the test definition 114 is associated with a step executor 254. In some embodiments, the step executors 254A-N may obtain and/or store data to context data store 228 and execute the steps, using the parameters from the test instance, against the system under test 122. Results from performance of the steps for the test instance are returned.

In embodiments, step executors are classes that can execute the test logic required to perform a particular task or validation step. In embodiments, each step executor corresponds to a particular step of a test definition, and will be executed in sequence. In embodiments, implementing step executors may be similar to implementing parameter providers in that each step executor class must implement an interface provided by the test workflow service 102. Rather than returning a list of parameters, step executors return a result that denotes if the step was successful and the test should continue or if the step (and thus the test) has failed, in some embodiments.

In embodiments, step executors can use arguments that are either hardcoded into the test definition itself or are determined by a parameter provider. All arguments may be mapped to names defined in the test definition by the test workflow service before a step executor function is invoked, so the step executor can run without needing to know which arguments were variables and which were specified in the definition, in embodiments. In some embodiments, step executors and parameter providers are both passed a test context object that contains state about a particular test run. For step executors, this object may allow resources to be created in one step and utilized in another.

Figure 3:
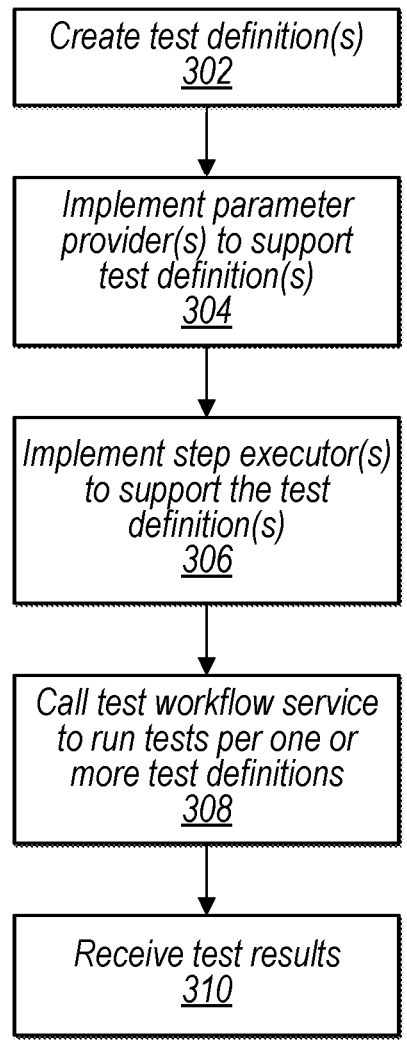
FIG. 3 is a process diagram illustrating system setup features for a scalable test workflow service, according to some embodiments.

FIG. 3 is a process diagram illustrating system setup features for a scalable test workflow service, according to some embodiments. In embodiments, a software engineer may (e.g., via user device 120) provide one or more of the user specified test definitions, parameter providers and/or step executors. In some embodiments, the user may instruct reuse of one or more previously-provided test definitions, parameter providers and/or step executors (e.g., from past test runs against the same or different systems under test), or some combination of new and previously-provided features.

At block 302, a test definition is created. At block 304, one or more parameter provider(s) are provided to support the test definition(s). At block 306, step executor(s) are implemented to support the test definition(s). At block 308, a test workflow service is called to run tests per one or more test definitions. At block 310, the rest results are received.

FIG. 4 is a process diagram that illustrates relationships among various nested workflows for a scalable test workflow service, according to some embodiments. In some embodiments, the scalable test workflow illustrated in FIG. 4 may be performed after a system has been provided with the test definitions, parameter providers and/or step executors, as illustrated in FIG. 3. The illustrated functionality may be performed by any of various workflow instances, such as the combination of run tests workflow instances 106A-N, test initialization workflow instances 108A-N, and test execution workflow instances 110A-N, illustrated in FIG. 2.

A request to run tests from one or more test definitions is received (e.g., from a user device 120 by an API of the test workflow service 102) (block 402). All the test definitions specified in the request are obtained (block 404), by a run test workflow instance 106 for example, and for each test definition a test initialization workflow (workflow 108) is initiated (block 406), by the run tests workflow instance 106N for example.

FIG. 4 illustrates that for each test definition, a test initialization workflow calls the one or more parameter provider(s) specified in the test definition to obtain a list of parameter combinations (each of blocks 408 represents a different test initialization workflow) and creates a test instance for each parameter combination and initiates a test execution workflow instance for each parameter combination (each of blocks 410 represents a different test initialization workflow instance).

Each test execution workflow instance calls a step executor for each step of the test definition using one or more parameters from the test instance (each of blocks 412 represents a different test execution workflow instance), and the results are aggregated and returned (block 414).

Figure 5:
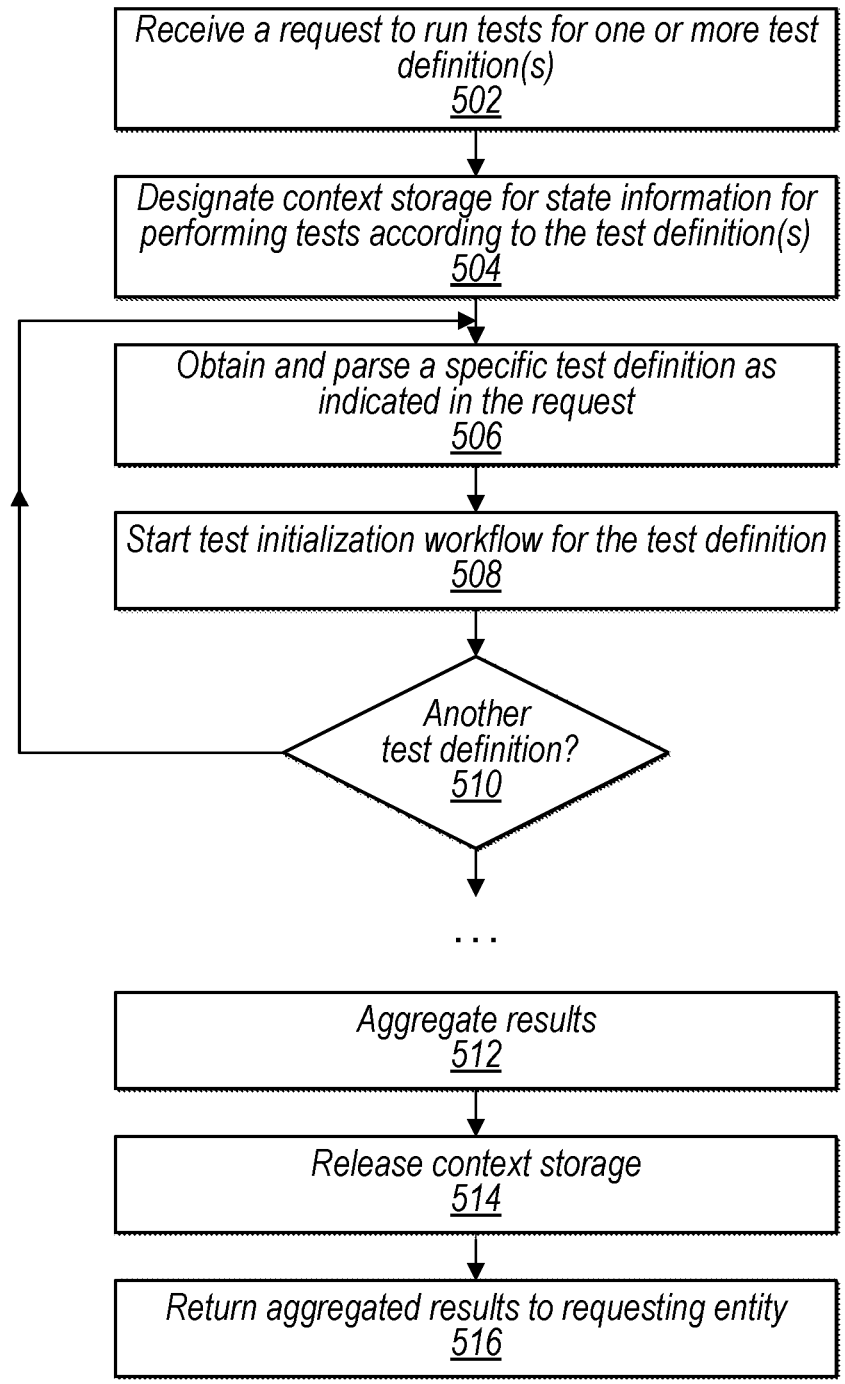
FIG. 5 is a process diagram showing an example run tests workflow for a scalable test workflow service, according to some embodiments.

FIG. 5 is a process diagram showing an example run tests workflow for a scalable test workflow service, according to some embodiments. The illustrated run tests workflow may be implemented via a run tests workflow instance 106, illustrated in FIG. 2, described above, for example, and generally acts to obtain data that it uses to start test initialization workflows based on that data, in embodiments.

At block 502, a request to run tests for one or more test definitions is received, by an interface of the test workflow service 102 from a user device 120 for example. The request may specify the test definitions, or may indicate a source for the test definitions, for example. The test workflow service 102 may perform some preliminary setup steps, such as designating context storage for state information for performing tests according to the test definitions (block 504). Such context storage may be useful in embodiments where various functionality is performed in a stateless environment (e.g., the event-driven, stateless compute service 830, illustrated in FIG. 8, described below). In some embodiments, the process may skip designation of the context storage. Designation of the context storage may be performed by a run tests workflow instance that is initiated in response to the request, in embodiments.

At block 506, a specific test definition indicated in the request is obtained and parsed (e.g., by the run test workflow instance, responsive to the request) and a test initialization workflow is started for the specific test definition (block 508). For a request that specifies more than one test definition, (block 510, yes) the system may iterate through steps 506 and 508 for each test definition, starting test initialization workflow instances for each test definition indicated in the request, until all test definitions have been parsed (block 510, no). The test initialization workflow instances obtain parameters, create tests and initiate test execution workflows that may, at some later point, produce results (not illustrated in FIG. 5) that may be provided back to the test initialization workflows that aggregate those results (block 512) and return the aggregated results to the requesting entity (block 516). In the illustrated embodiment, the run test workflow releases (block 514) the context storage obtained in block 504.

Figure 6:
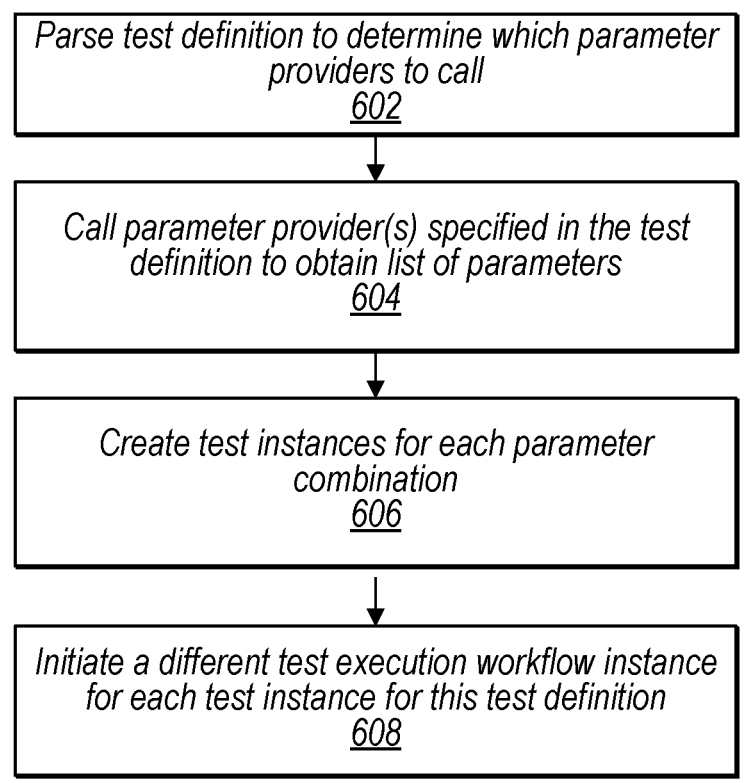
FIG. 6 is a process diagram showing an example test initialization workflow for a scalable test workflow service, according to some embodiments.

FIG. 6 is a process diagram showing an example test initialization workflow for a scalable test workflow service, according to some embodiments. In embodiments, each of the test initialization workflow instances $108_{1-Y}$ in FIG. 2 may perform the operations illustrated in FIG. 6 as a test initialization workflow.

A specific test definition is obtained and parsed to determine which parameter providers to call (block 602), by test initialization workflow instance 108y, for example, and the parameter providers specified in the test definition are called to obtain a list of parameters (block 604), by test initialization workflow instance 108y, for example. Test instances are created for each parameter combination in the list (block 606) (also illustrated as the "write" to the test instances per parameter combinations 240 in FIG. 2) and different test execution workflow instances are initiated for each test instance for this test definition (block 608) (also illustrated as the "specific test instance" obtained from the test instances per parameter combinations 240 by test execution workflow instance $110_Z$ in FIG. 2). In embodiments, some such functionality may facilitate parallel processing to reduce the amount of time needed to obtain test results. In some embodiments, the system may batch or queue the execution workflow instances.

In embodiments, it is contemplated that the system may function to process the parameters in batches, or on a parameter-set-by-parameter-set basis, without limitation. In embodiments, the system is arranged to facilitate creation of numerous test instances to be executed against a system under test. For example, a requested test run may specify multiple test definitions, and each test definition triggers initiation of a respective test initialization workflow instance, wherein each test initialization workflow instance creates numerous test instances, based on the numerous possible parameter combinations for the test definition.

In some embodiments, each workflow must execute exactly one test instance per test definition. However, for some embodiments, without changing other aspects about how these workflows work, batching could be applied variously. In a non-limiting example of batching, suppose there are one million test instances that get created by a test initialization workflow. In some embodiments this would cause a need to create one million test execution workflows. In some systems, the services used to power this cannot handle such a level of parallelization. As a result, some embodiments may implement batch processing. Instead of creating one million test execution workflows, the system may be configured to create ten test execution workflows, each responsible for executing an even subset (in this case, 100,000) of test instances. In embodiments, the rest of the process of the test execution workflow could remain as disclosed herein, but instead of executing one test, it would execute its batch of test instances one-by-one.

In some embodiments, the test initialization workflow might be configured to operate in the same way—instead of creating a test initialization workflow for all test definitions (suppose 100) the test definitions could be partitioned into some batch size (say 20 per test initialization workflow with 5 test initialization workflows total) and have each test Initialization workflow handle processing each of its allocated batch one by one, in embodiments.

Figure 7:
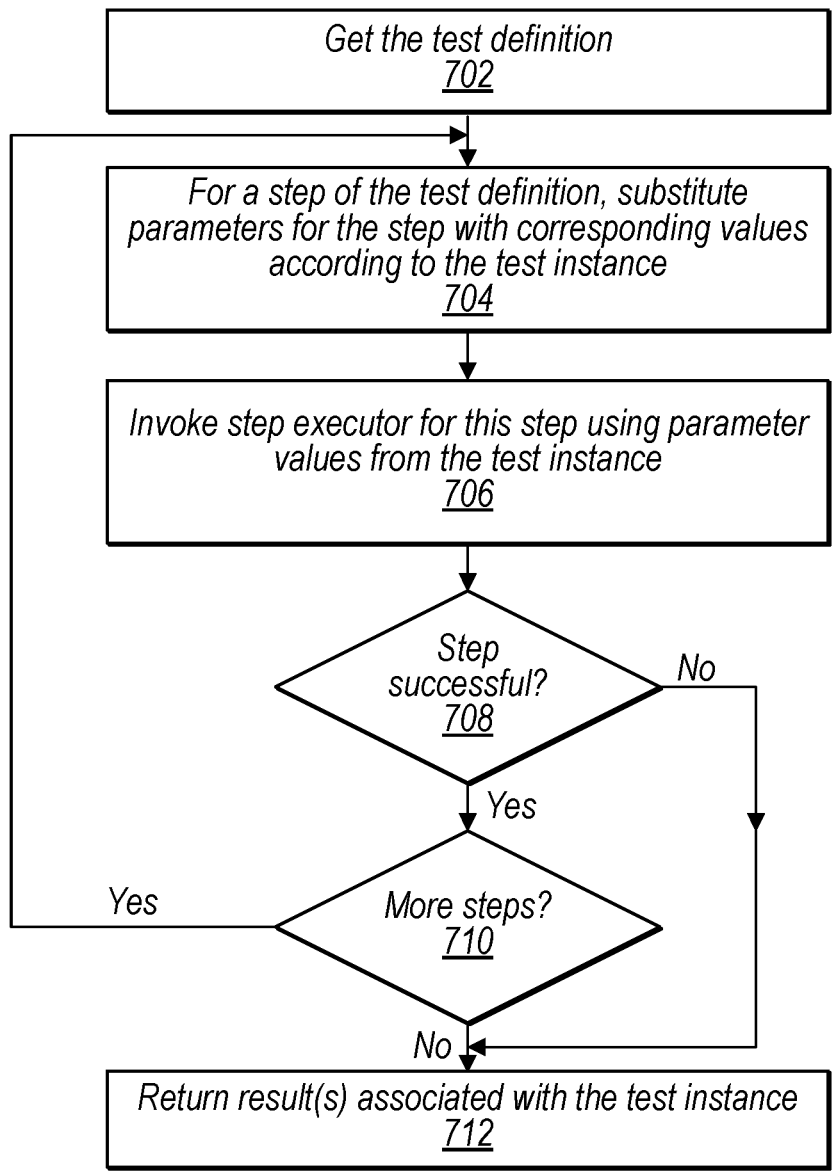
FIG. 7 is a process diagram showing an example test execution workflow for a scalable test workflow service, according to some embodiments.

FIG. 7 is a process diagram showing an example test execution workflow for a scalable test workflow service, according to some embodiments. The illustrated steps of the process may be performed by individual ones of the test execution workflow instances $110_1$-$110_Z$, in embodiments. At block 702 a test definition is obtained, and for a step of the test definition, parameters for that step are substituted with corresponding values according to the test instance (block 704). A step executor is invoked for that step using the parameter values from the test instance (block 706). If the step executes successfully (e.g., executes without producing an error or without producing a result outside an acceptable range of results, etc.) the test execution workflow will move on to the next step (block 710, more steps? Yes) and repeat the process of blocks 704, 706, 708, 710 until all the steps for that test instance are complete. When all the steps of the test instance of completed successfully (block 710, more steps? No) the execution workflow instance may return result(s) associated with the test instance (block 712), such as an indication that the test steps for that test instance all completed successfully. For a step that is not successful (e.g., a step that produces an error or produces a result outside an acceptable range of acceptable results, etc.) the test execution workflow may forego any remaining steps of the test instance and return results associated with the test instance (e.g., that one or more of the steps failed to execute successfully, etc.).

In some embodiments, if a step is not successful, the step may be retried for some N number of times (e.g., in case the system is waiting on something to be true that is not true at the moment, but could be in the future). For example—if a test is validating that a migration has completed successfully, the system may first determine that the data has not migrated, but after retrying a number of times over some limited period of time, the system may determine that the data has migrated. In some embodiments, such functionality may be implemented via the test workflow service or via a workflow application or service hosted by a service provider.

FIG. 8 is a logical block diagram illustrating an example service provider network that implements a scalable test workflow service, according to some embodiments. FIG. 8 illustrates a service provider network 810 of a network-based service provider (e.g., a cloud-based service provider) that provides compute-based and storage-based services to customers of the service provider. In embodiments, nodes of the service provider network may host one or more services (e.g., service-provider provided services accessed by customers/clients or a customer's services may execute on the hosts of the service provider, or combinations thereof, etc.) In the illustrated embodiment, clients (both external clients 880, via a client network or the like, and/or internal clients 880) may access the services of the service provider network 810 via network 870, for example.

In the non-exhaustive illustrated embodiment, service provider network 810 hosts resources such as virtual compute instances and block-bases storage, but also services such as test workflow service 102, other service(s) 810, workflow service(s) 820, event-driven, stateless compute service 830, database service 840, other storage service(s) 850 (e.g., scalable object storage infrastructure, scalable, shared file storage service, durable, low-latency block-level storage volumes, etc.) other compute service(s) 860, etc.

Various components of, and associated with, the test workflow service illustrated in FIGS. 1 and 2 may be implemented in various combinations of the above-noted resources and/or services. For example, in some embodiments, the components of test workflow service 102 in FIG. 1 may be implemented as a service among the services of the service provider as illustrated in FIG. 8. In some embodiments, one or more portions of the test workflow service 102 may be implemented by some combination of the resources and/or services illustrated in FIG. 8. For example, the test workflow service 102 (at least the portions that receive the request to run a test and that provides the test results back in response to the request) may be implemented as illustrated in FIG. 8, and the various workflow instances (e.g., run tests workflow instance 106, test initialization workflow instance 108, test execution workflow instance 110 may launch in the workflow service 820 of the service provider. In embodiments, workflows may be created for all actively running tests for a particular test run. Each workflow may invoke the parameter provider and/or step executor functions in order to take some action on a particular test definition. Some such embodiments have the benefit of parallelizing a test run across multiple machines. In some such embodiments, the system may take action on the next step of a test instance as soon as it is ready.

In some embodiments, components of the test workflow service, such as the parameter providers 116 and/or the step executors 118 may execute in a compute service environment 860 of the service provider network or in the event-driven stateless compute service 830 of the service provider network. For example, use of stateless, event-driven compute instances reduce the amount of compute resources consumed for a particular test instance. Also, since the scalable workflow service workers (not illustrated) polling for work only need to run if a test has been requested, serverless compute resources (e.g., some with autoscaling, in some embodiments) may be used in order to scale up and scale down the scalable test workflow service 102 fleet as needed.

Context 228 and/or test instance parameter combinations 240 may be stored at a database service 840 or other storage service 850 of the service provider network, in embodiments.

The system under test 122 is also contemplated broadly, without limitation. For example, the system under test 122 may be hosted on the same service provider network 810 as the test workflow service, or may be hosted on a client network 890. In embodiments, the system under test 122 may be hosted on different network-based service provider network from network 810, or by a different customer/client network that the customer/client that requested execution of the test. With similar breadth, the request to run the test may originate from an internal or external client 880, from another service provider, from one of the services 810-880, etc. without limitation, and the results may be provided to any of similar such entities or the like, without limitation.

Some embodiments of a test workflow service 102 may implement various APIs, such as, but not limited to a software development kit (SDK) set of tools for using the service 102. Various objects may be defined for the SDK, such as an interface for the parameter providers and step executors, and/or code for receiving a request to perform a test run and turning that request into code for customers of the service to build parameter providers and step executors. APIs of the service may include a step executor upload API for uploading step executors, and/or a parameter provider upload API for uploading parameter providers (e.g., via which service 102 takes a code package, build by a customer on top of the SDK and creates the corresponding logic in the compute service that executes that logic. Another API uploads test definitions. In some embodiments, the test workflow service 102 may parse the test definitions for parameter providers and step executors and verify that those classes exist (providing an error for class in the test definition that do not exist). Another API is a run test API that, for all the test definitions for the test run, all the parameter providers and all the step executors provided, bundles that information and sends it to start the rest run workflow. Another API, a describe test run status API may provide an interface for obtaining a status of a test run (e.g., enumerating all the test runs completed, enumerating how many tests are currently running, how many test are still to be run, a return status of a particular test, etc.).

FIG. 9 is a block diagram showing an example computing system to implement the various techniques described herein, according to some embodiments. For example, in one embodiment, the above-described scalable test workflow system (and/or the system under test) may be implemented by one or more of a computer system, for instance, a computer system as in FIG. 9 that includes one or more processors executing program instructions stored on a computer-readable storage medium coupled to the processors. In the illustrated embodiment, computer system 900 includes one or more processors 910*a-n* coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be one embodiment of a computer-accessible medium configured to store instructions and data accessible by processor(s) 910. In various embodiments, system memory 920 may be implemented using any non-transitory storage media or memory media, such as magnetic or optical media, e.g., disk or DVD/CD coupled to computer system 900 via I/O interface 930. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940. In the illustrated embodiment, program instructions (e.g., code) and data implementing one or more desired functions, e.g., functionality with regard to the various illustrated workflows etc. described above in FIGS. 1-8, are shown stored within system memory 920 as test workflow service code 102 and data store 104.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 810/870. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fiber Channel SANs, or via any other suitable type of network and/or protocol.

In some embodiments, system memory 920 may be one embodiment of a computer-accessible medium configured to store program instructions and data as described above for FIG. 1-8. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
one or more computers comprising respective processors and memory configured to implement:
a test workflow service configured to:
initiate, in response to a request to run a test, a test initialization workflow instance for individual ones of one or more test definitions indicated in the request, wherein a test definition specifies:
a plurality of test steps of the test,
one or more parameter providers to provide parameters for execution of the test steps, and
one or more step executor functions associated with the test steps of the test;
individual ones of the one or more test initialization workflow instances configured to:
call one or more of the parameter providers specified in the corresponding test definition to obtain a list of parameter combinations;
create a test instance for respective ones of the parameter combinations; and
initiate a test execution workflow instance for one or more of the parameter combinations;
individual ones of the plurality of test execution workflow instances configured to:
call a step executor for individual steps of the test definition using parameters from the corresponding test instance, and
return a result associated with the test instance; and
the test workflow service further configured to aggregate and return results of the test to a requesting entity.

2. The system of claim 1, wherein:
the requested test is configured to test a target system under test;
at least one of the parameter providers is configured to, when called, obtain configuration information about the target system under test as at least part of the list of parameter combinations;
one or more of the step executors, when called, execute service test logic in accordance with the obtained configuration information against the target system under test and return a result.

3. The system of claim 1, wherein the one or more computers comprising respective processors and memory are configured to further implement:
a run tests workflow instance, initiated by the test workflow service in response to the request and configured to:
obtain all of a plurality of test definitions indicated in the request;
perform said initiate one or more test initialization workflow instances for individual ones of the plurality of test definitions; and
perform said aggregate and return the results of execution of the test steps.

4. The system of claim 1, wherein:
the test initialization workflow instances, and the test execution workflow instances are initiated at one or more of the one or more computers hosting a workflow service on a network-based service provider network;
the parameter provider functions and step executors are executed on one or more of the one or more computers in an event-driven, stateless compute environment hosted on the network-based service provider network;
the test definitions and the test instances are stored in one or more data stores hosted on the network-based service provider network; and
one or more context objects configured to track a state of the test are stored in a context object data store hosted on the network-based service provider network.

5. A method, comprising:
performing by one or more computing devices:
in response to receiving, by a test workflow service, a request to run a test specified in one or more test definitions,
obtaining the one or more test definitions; and
for individual ones of the one or more test definitions:
obtaining a list of parameter combinations for the test definition;
creating, for respective ones of the parameter combinations, a test instance that specifies:
one or more test steps of the test definition, and
the corresponding parameter combination;
calling, for individual ones of one or more test instances and using the parameter combination for the respective test instance, one or more step executors to execute the one or more test steps of the test instance;

aggregating results from the execution of the one or more test steps; and returning the aggregated results.

6. The method of claim 5, wherein said obtaining the list of parameters comprises:

parsing, by a test initialization workflow instance, a corresponding one of the test definitions to determine one or more parameter provider functions to call; and calling the one or more parameter provider functions specified in the corresponding test definition to obtain a list of parameters.

7. The method of claim 6, wherein said calling the one or more parameter provider functions specified in the test definition to obtain the list of parameters comprises:

triggering a function registered at an event-driven, stateless compute service to determine the list of parameters.

8. The method of claim 6, wherein said creating the test instances comprises:

creating, by the test initialization workflow instance, test instances for individual parameter combinations, wherein individual test instances specify one or more steps from the corresponding test definition and the respective parameter combination.

9. The method of claim 5, wherein said calling the one or more step executors to execute the one or more test steps of the test instance comprises:

for a step of the test definition, substitute parameters for the step with corresponding values according to the corresponding test instance;

invoke the step executor for the step using the parameter values from the corresponding test instance; and repeating said substitute and said invoke for the test steps of the test instance.

10. The method of claim 5, wherein said calling the one or more step executors to execute the one or more test steps of the test instance comprises:

triggering a strep executor function registered at an event-driven, stateless compute service to request execution of the test steps in accordance with the corresponding parameters.

11. The method of claim 10, further comprising:

designating context storage for state information for performing tests according to the test definitions;

storing state information between different invocations of the step executor implemented via the event-driven, stateless compute service to perform different steps for a test; and releasing the context storage after obtaining the results of performing the test.

12. The method of claim 5, wherein:

the request to run the test targets a system under test;

said obtaining the list of parameter combinations comprises calling a parameter provider to perform, when called:

obtaining configuration information about the target system under test as at least part of the list of parameter combinations;

one or more of the step executors perform, when called:

executing service test logic in accordance with the obtained configuration information against the target system under test and return a result.

13. One or more non-transitory computer-readable storage media storing program instructions, executable on or across one or more processors to perform:

in response to receiving a request to run a test specified in one or more test definitions, obtaining the one or more test definitions; and for individual ones of the one or more test definitions:

obtaining a list of parameter combinations for the test definition;

creating, for respective ones of the parameter combinations, a test instance comprising one or more test steps specified in the test definition and the corresponding parameter combination;

calling, for individual ones of the test instances and using the parameter combination for the respective test instance, one or more step executors to execute the test steps of the test instance;

aggregating results from the execution of the test steps; and returning the aggregated results.

14. The one or more non-transitory computer-readable storage media of claim 13, storing program instructions executable to perform:

parsing individual ones of the one or more test definitions to determine, for individual test definitions:

a plurality of test steps of the test, one or more parameter providers to provide parameters for execution of the plurality of test steps, and one or more step executor functions associated with the plurality of test steps.

15. The one or more non-transitory computer-readable storage media of claim 13, wherein to perform said obtaining the list of parameter combinations for the test definition the program instructions are executable to perform:

triggering a parameter provider function registered at an event-driven, stateless compute service to request one or more of the parameters.

16. The one or more non-transitory computer-readable storage media of claim 15, storing program instructions, executable on or across the one or more processors to perform:

designating context storage for state information for performing tests according to the test definitions;

storing state information between different invocations of the parameter provider function triggered at the event-driven, stateless compute service to request the one or more parameters; and releasing the context storage after obtaining the results of performing the test.

17. The one or more non-transitory computer-readable storage media of claim 13, wherein to perform said obtaining the list of parameters and creating the test instances the program instructions are executable to perform:

initiating, at a workflow service for individual test definitions, test initialization workflow instances that perform said obtaining the list of parameters and said creating the test instances.

18. The one or more non-transitory computer-readable storage media of claim 13, wherein to perform said calling the one or more step executors to execute the test steps of the test instance the program instructions are executable to perform:

initiating, at a workflow service, test execution work flow instances for individual parameter combinations, wherein the test execution workflow instances perform said calling the one or more step executors to execute the test steps of the test instance.

19. The one or more non-transitory computer-readable storage media of claim 13, wherein to perform said calling the one or more step executors to execute the test steps of the test instance, the program instructions are executable to perform:
- for a step of the test definition, substituting parameters for the step with corresponding values according to the corresponding test instance;
- invoking the step executor for the step using the parameter values from the corresponding test instance; and
- repeating said substituting and said invoking for the test steps of the test instance.

20. The one or more non-transitory computer-readable storage media of claim 13, wherein:
- the request to run the test targets a system under test;
- to perform said obtaining the list of parameter combinations the program instructions are executable to perform:
  - triggering a parameter provider that when triggered obtains configuration information about the target system under test.

* * * * *